Nov. 27, 1956  A. A. ROBINSON ET AL  2,772,050
ELECTRONIC DIGITAL COMPUTING MACHINES
Filed June 21, 1950                    5 Sheets-Sheet 4
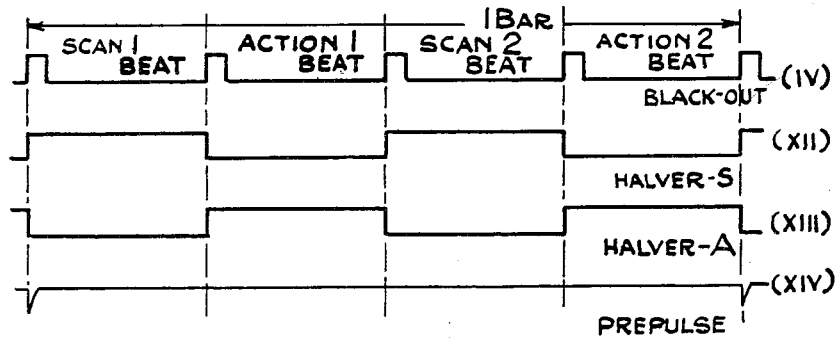
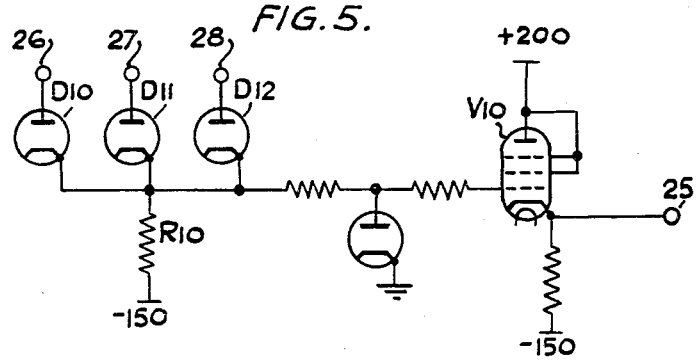
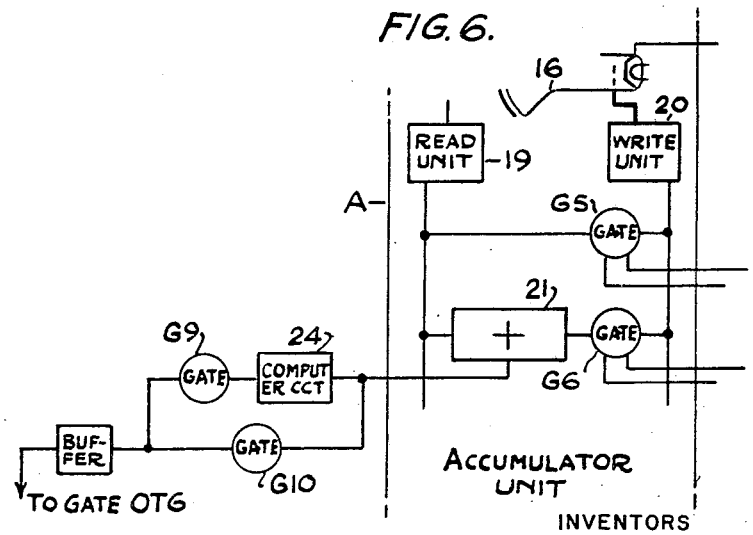
INVENTORS
A. A. ROBINSON
F. C. WILLIAMS
T. KILBURN

United States Patent Office 2,772,050
Patented Nov. 27, 1956

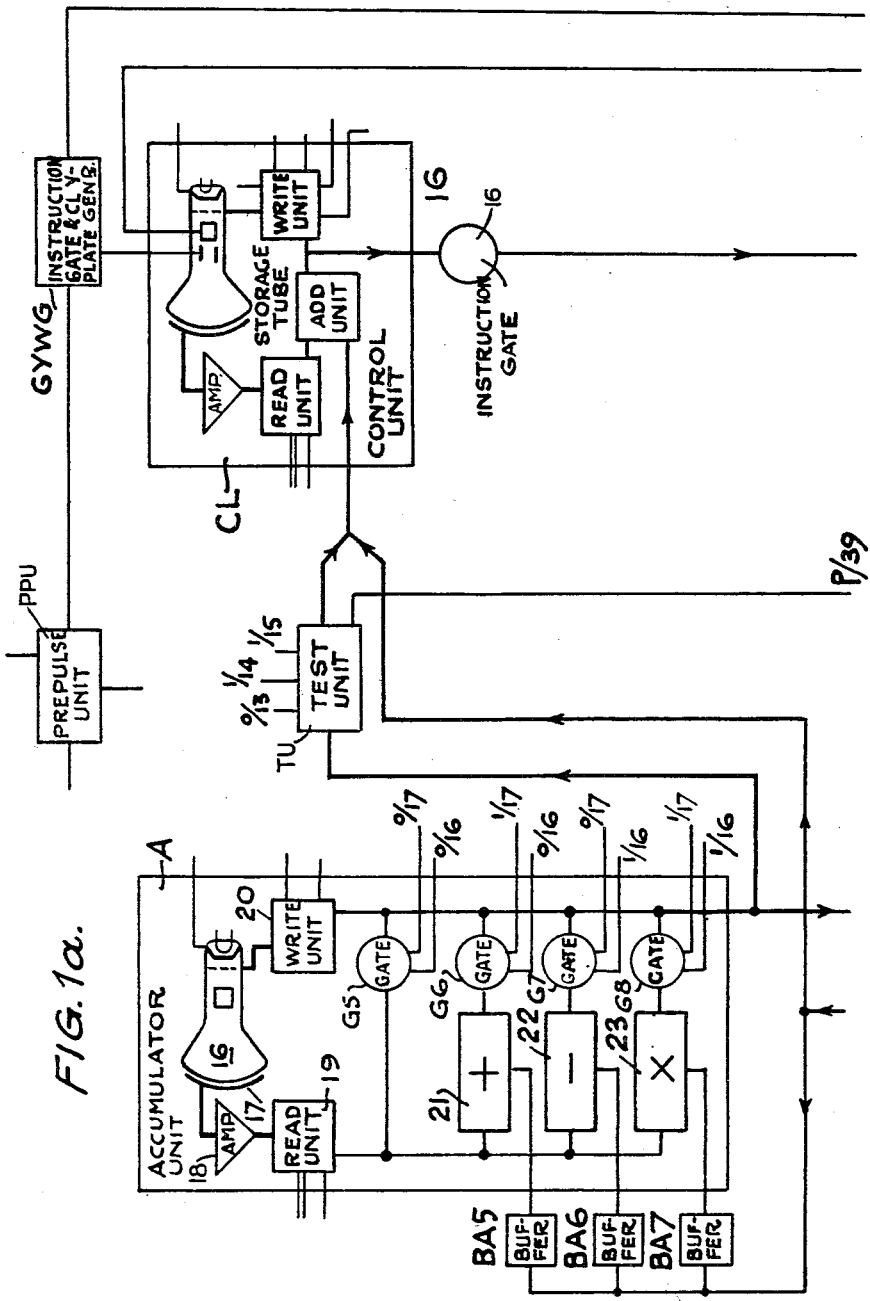

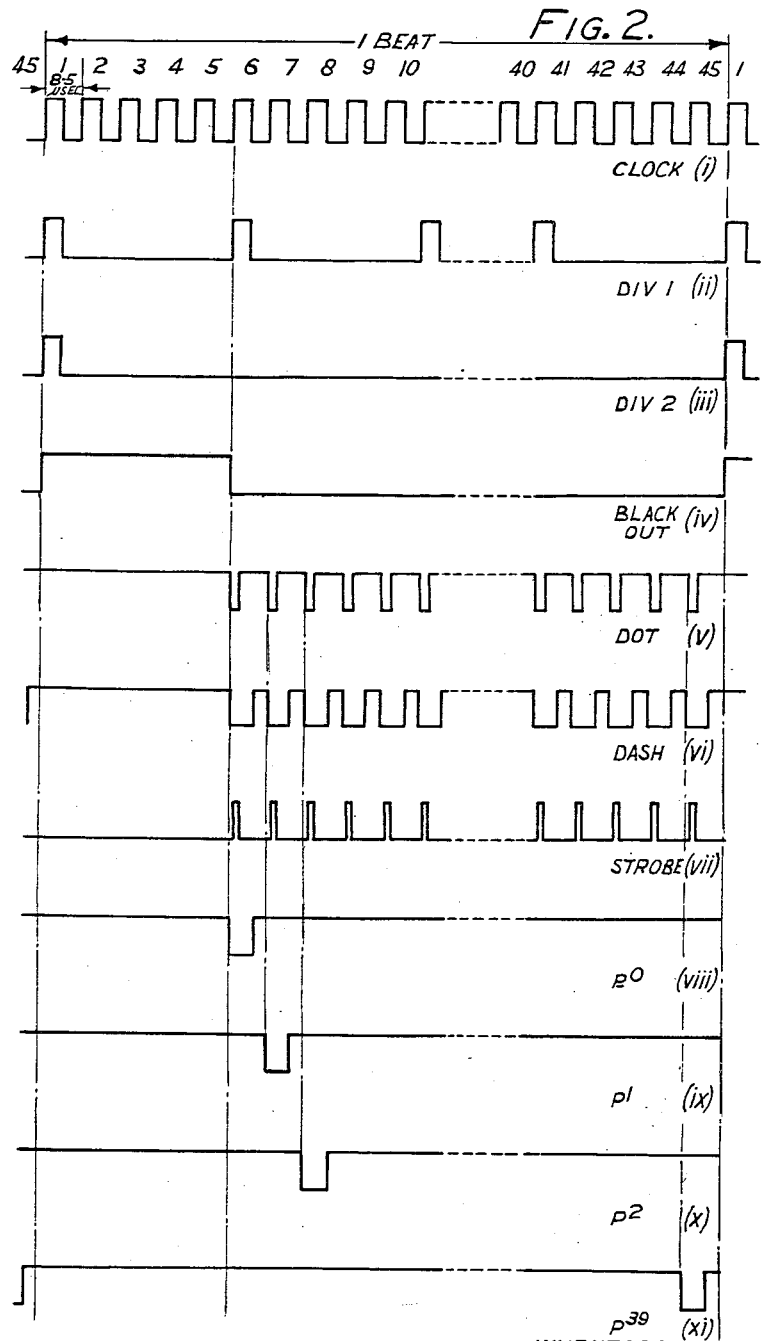

2,772,050

ELECTRONIC DIGITAL COMPUTING MACHINES

Arthur Alexander Robinson, Scunthorpe, Frederic Calland Williams, Timperley, and Tom Kilburn, Manchester, England, assignors to National Research Development Corporation, London, England, a corporation of Great Britain Application June 21, 1950, Serial No. 169,386

Claims priority, application Great Britain June 22, 1949

4 Claims. (Cl. 235—61)

The present invention relates to electronic digital computing machines involving the use of storage or memory devices of the type described in copending applications of Frederic C. Williams, Serial No. 790,879, filed Dec. 10, 1947; Frederic C. Williams et al., Serial No. 50,136, filed Sept. 20, 1948 and Frederic C. Williams et al., Serial No. 124,192, filed Oct. 28, 1949, now Patent No. 2,527,336. As described in these specifications, information is stored on the screen of a cathode-ray-tube in the form of a charge pattern which is regenerated by being repeatedly scanned by an electron beam which is modulated by signals obtained from and characteristic of each unit or digit representing section of the charge pattern.

This simple regeneration process which is described in copending application of Frederic C. Williams et al., Serial No. 93,612, filed May 16, 1949, is carried out by means of a regeneration circuit in which a pick-up electrode associated with the cathode-ray-tube screen supplies signals which determine the nature of the further signals used to control the irradiation of the screen.

Copending application of Frederick C. Williams, Serial No. 119,306, filed Oct. 3, 1949, now Patent No. 2,671,607, issued March 9, 1954, describes the provision of a computing circuit within the regenerative loop and which is adapted to receive signals from the pick-up electrode and also from an external source and to provide resultant signals for supply to the means used for controlling the irradiation of the tube screen.

The signals from the pick-up electrode and the signals from the external source may be required to be combined in various ways according to the type of mathematical process which is required to be carried out. For instance, two numbers, represented respectively by the signals received from the pick-up electrode and from the external source, may be required to be added, subtracted, multiplied or divided. The provision of a subtracting circuit in the regenerative loop in the manner described in the aforesaid copending application, Serial No. 119,306 now Patent No. 2,671,607 would enable a considerable number of different operations (in addition to plain subtraction) upon the two input signals to take place under the control of a programme of instructions. In order to enable any of a large number of arithmetical operations to take place, however, the number of instructions involved in each operation would have to be of great complexity and would require relatively long intervals of time for their completion when only one form of arithmetical or computing circuit is provided.

It is one object of the present invention to provide a regenerative circuit of the type set forth in which a number of different forms of computing circuits can be connected at will into the regenerative loop so that any of a number of standard mathematical operations can be performed as desired and the associated programme of instructions can accordingly be much simpler than would otherwise be necessary.

According to the present invention, therefore, apparatus as claimed in patent application No. 119,306, now Patent No. 2,671,607, and comprising a cathode-ray-tube storage device having a storage screen, an associated pick-up electrode, means for controlling the irradiation of said screen and a regeneration circuit between said pick-up electrode and said controlling means, has said regeneration circuit arranged so as to include a plurality of computing circuits and switching means by which any one of said computing circuits may be alternatively switched into the regeneration circuit so that the signal supplied to said controlling means may be the result of any chosen one of a number of computing operations performed upon the signal from the pick-up electrode of said tube and a signal supplied from an external source.

In order that the invention may be more clearly understood one embodiment thereof will now be described with reference to the accompanying drawings in which:

Figs. 1a and 1b show in block schematic form the various essential components of an electronic digital computing machine embodying the invention.

Figs. 2 and 3 illustrate by means of diagrams, a series of fundamental voltage waveforms which are available within the machine of Figs. 1a and 1b.

Fig. 4 is a detailed circuit diagram of one section of a staticisor device shown in Fig. 1, while Fig. 5 is a detailed circuit diagram of one suitable form of switching or gate circuit usable for controlling the operation of the computing circuits.

Fig. 6 is a fragmentary circuit diagram showing a modification of the accumulator of Fig. 1.

Figure 1B:
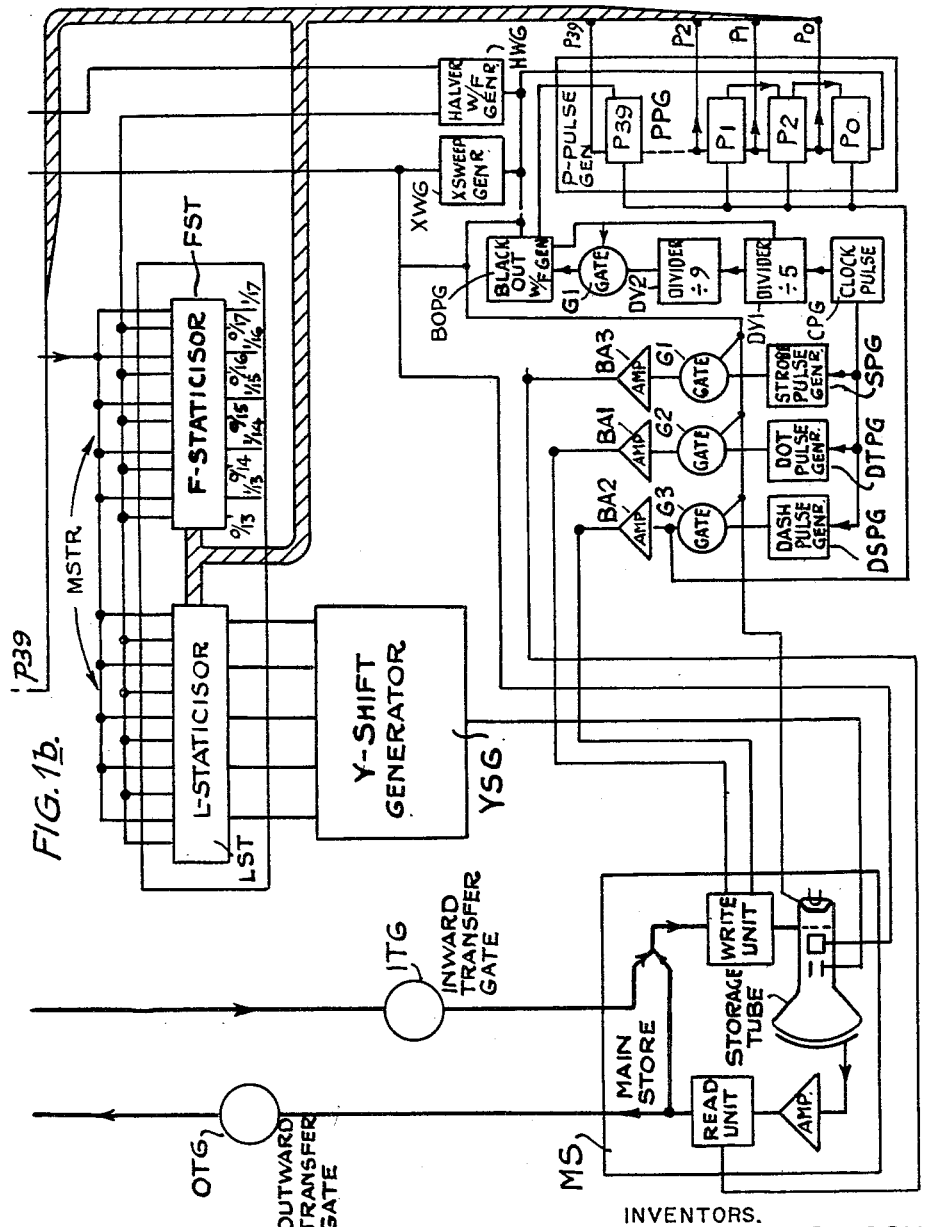

Referring first to Figs. 1a and 1b, the machine thereshown is a simplified version, apart from the special construction of the computing arrangements to be described later, of that already described in detail in Figs. 1a and 1b of copending application of Frederick C. Williams et al., Serial No. 165,434, filed June 1, 1950 to which further reference should be made when detailed information is desired.

This machine operates under the binary system and is of the serial type. It utilises for various "memory" or storage purposes cathode ray tube storage means of the kind described, wherein each binary digit "0" or "1" of a number or the equivalent coded address or instruction word is represented by one or other of two, e. g. "dot" or "dash" forms of discrete electric potential charge upon the screen of a cathode ray tube. The group of sequential dot and dash charges comprised in each number or word are arranged along the whole or part of a single linear deflection scan of the cathode ray tube beam so that, when required, a plurality of such numbers or words may be recorded and stored side by side, by causing the beam to provide a television type raster. Selection of any desired number or word can then be achieved by arranging for the appropriate positioning of the tube beam in the transverse or "Y" direction before commencing its linear or "X" scanning movement.

The machine shown in Figs. 1a and 1b comprises a Main store MS which includes one or more cathode ray tube storage devices as referred to above arranged for side-by-side or raster type line storage and provided with the necessary ancillary apparatus by which numbers or words, in the form of pulse trains, can be written thereinto, read out therefrom, erased or continuously regenerated. Associated with this main store MS is a Y-shift generator unit YSG for providing the requisite transverse or Y-deflection to the beam of the cathode ray tube of the main store for selecting any chosen one of the raster lines. The operation of this unit YSG is itself controlled during certain portions of the operation cycles of the machine by a portion, hereinafter referred to as the L-staticisor unit LST, of a staticisor MSTR for the main store and whose function is to translate a dynamic pulse form signal into suitable static control voltages for the unit YSG whereby the latter provides a deflection of the tube beam in the main store MS to a raster line whose address is that indicated by the pulse signal fed to the staticisor unit.

The arithmetical operations upon either number or instruction words are effected in the Arithmetical organ or Accumulator A which will be described in detail later and which includes a single cathode ray tube storage device arranged to deal with only one number or word at a time and provided with the requisite writing, reading, erasing and regenerating ancillary apparatus.

The control of the various elements of the machine during each bar in obedience to the particular instruction of the moment is effected by the control unit CL which includes a single cathode ray tube storage device arranged for two-line storage and provided with the requisite ancillary apparatus for effecting writing in, reading out, erasing and regenerating each of the two stored words. This ancillary apparatus also includes means by which an externally applied number, in the form of a pulse signal, may be added to a word already in the store.

The necessary transverse or Y-deflection of the beam of the cathode ray tube in the control unit CL in order to deal with the appropriate one of the two stored words, is controlled by an instruction gate and Y-Plate waveform generator unit GYWG which is itself controlled in its operation by certain fundamental timing waveforms existing within the machine.

The machine being described operates at a rhythm of four beats to each bar and the initiation of each bar is controlled by a special pulse waveform, called a "prepulse" generated within a Prepulse Unit PPU.

For the purpose of automatically changing the instruction word at the end of each bar so that the various sequential operations as defined by the programme laid down for the machine are effected in order the Test Unit TU is provided and serves, in combination with ancillary adding apparatus of the control unit CL, normally, to add 1 to the address number of a word stored in the latter. This test unit TU also comprises means for determining the compliance or otherwise of a solution number existing within the accumulator A with a certain requirement, e. g. of its sign, and dependent upon the result of such test, for altering the aforesaid addition of 1 to an addition of 2 to the address number within the control unit.

The routing of the various signals between units of the machine and the choice of its manner of operation are controlled through the intermediary of a number of gate or equivalent circuits among which are the Inward Transfer Gate ITG, the Outward Transfer Gate OTG and the Instruction Gate IG. These gates and other circuits are controlled by the static voltage levels provided at different terminals of a further portion, the F Staticisor unit FST, of the staticisor MSTR and which, in similar manner to the L-staticisor LST is itself controlled by portions of the dynamic pulse form signal fed thereto.

In broad outline the operation of the machine is as follows:

Number words related to the mathematical quantities being dealt with within the machine will consist of an appropriate collection of binary digits up to the maximum capacity of one line of the storage tube which, in this case, is forty digits.

The instruction words within the machine will in general comprise two separate sections, the first consisting of a group of binary digits, which are related to and serve to signal the particular address, i. e., the particular line or Y-level in the main store MS at which a desired number word is located and a second section, again composed of a collection of binary digits which serve to signal and control the nature of the function which is required to be carried out on the particular number chosen by the previous address section of the word. In general with a machine of the simplest type described a total of five binary digit symbols will suffice to select any desired address level while a total of five binary digit symbols is sufficient to set up any of the different function operations which can be carried out. Accordingly, the 1st, 2nd, 3rd, 4th and 5th digits of the word are used to signal the address and the 14th, 15th, 16th, 17th and 18th digits to signal the functional operation.

Assuming all the required number and address words have been inserted in the main store MS then the normal automatic operation cycle is as follows. Each bar will be initiated by a prepulse from the prepulse unit PPU. During automatic operation on the first (Scan 1) beat regeneration takes place in all storage units and while it is doing so in the control unit CL a control instruction number ($n$) already stored in control unit CL on one, the CI line, of its two levels will be increased by 1 automatically by a pulse sent out from the test unit TU and the resultant new number ($n+1$) simultaneously read out of the control unit CL through the opened instruction gate IG to the L-staticisor LST where the 1st to 5th digits of the number will set such L-staticisor to a condition which provides a series of static output voltages for controlling the Y-shift generator YSG during the next following (action) beat such as will adjust the Y-level of the main store MS during that action beat to that of the next instruction number which is to be read out from the main store MS.

On the next (Action 1) beat there is no regeneration anywhere but the newly selected or Present Instruction number is read out from the main store MS through the opened outward transfer gate OTG into the store CL at the alternative or P. I. level of the latter. The beam scanning level of the storage tube of this unit is suitably altered by a waveform supplied from the unit GYWG.

In the next following (Scan 2) beat, the new, Present Instruction word in the store CL is read out through the instruction gate IG to the F-staticisor FST and the L-staticisor LST. The F-staticisor is operated by the 14th–18th digits of such word to provide a series of different voltages which when applied to the various circuit elements such as the inward and outward transfer gates ITG and OTG the erase, writing, adding, subtracting, or reading circuits of the various store units and, as described later, elements of the Accumulator A, serve to set up the necessary routing and control arrangements for the particular function operation next to be performed. The address digits i. e. the 1st to 5th digits of the same word cause similar operation in the L-staticisor LST to reset the Y scan generator of the main store MS to the particular new level of the number stored in the main store MS which is next required to take part in the chosen operation.

In the fourth (Action 2) beat the aforesaid Present Instruction is obeyed by the transference of the selected number out of the main store MS over the particular path and through the operation of the appropriate other units as selected by the F-staticisor FST to a destination which will normally be the accumulator A.

In the next following operation the control instruction ($n+1$) previously existing at the first level in the unit CL is again increased by 1 whereupon the cycle is repeated substantially along the lines described. By arranging that the successive present instruction words read out from the main store define the required programme of operation, the required computation will be completed automatically.

The basic timing of the machine shown in Figs. 1$a$ and 1$b$ is controlled by a pulse generator circuit CPG which provides a series of square pulses whose period time is 8.5 microseconds. These pulses shown in diagram (i) of Fig. 2 will hereinafter be called Clock Pulses. The time period of a total of 45 of these Clock pulses is assigned to each beat of the machine and of this period the time required by 5 Clock pulses is assigned to the requisite flyback motion of the beam of each cathode ray tube storage device before each linear scanning motion leaving a total of 40 Clock periods for the actual composition of each number or word. Each digit of a number or word is arranged to fall within the period of 1 Clock pulse and the machine therefore has a capacity as already stated of 40 digits in each number or word.

The Clock pulses are applied to a divider circuit DV1 which can be of any suitable form to provide an output pulse for every five input pulses as shown in waveform (ii) of Fig. 2. These pulses will hereinafter be called the DIV1 pulses and are then applied to a further divider circuit DV2 which again is of any suitable form to provide an output pulse for every nine input pulses as shown in wave form (iii) of Fig. 2. These pulses, which occur one in synchronism with each 45th Clock pulse will hereinafter be referred to as the DIV2 pulses.

The pulses from divider circuit DV1 are applied as one triggering input to a flip-flop circuit BOPG, the other triggering input of which is supplied from the divider circuit DV2 by way of a gate circuit G1 which is opened by the further supply thereto of the pulses from the divider circuit DV1. The consequential output from circuit BOPG, is a waveform as shown in diagram (iv) of Fig. 2, consisting of positive going square pulses during the period of Clock pulses 1 to 5 and then a quiescent period until the end of Clock Pulse 45 and so on. This waveform which is used to ensure suppression of all the cathode ray tube beams during the flyback time following each line scan, will hereinafter be called the Black-Out waveform.

The requisite repetitive saw-tooth waveforms for causing linear scanning movement of the various cathode ray tube beams in the X direction are provided by the X-time base generator XWG which is controlled by the Black-Out waveform so that the flyback portion commences at the instant of commencement of each positive going Black-Out pulse and the linear scanning portion at the instant of termination of each Black-Out pulse.

The setting up of one or the other of the two different forms of discrete charge upon the cathode ray tube screens, representative respectively of the binary digits "0" and "1" is effected by intensity modulation of the tube beam for time periods of different lengths whereby, due to the concurrent X scanning movement of the beam, a "dot" or a "dash" charge pattern is provided. For effecting such beam modulation the machine is provided with a dot pulse generator DTPG and a dash pulse generator DSPG each of which are supplied with the Clock waveform to initiate triggering of suitable pulse generating circuits, the constants of the circuit of DTPG being such as to provide a series of two microsecond negative-going pulses each coincident in their commencement with the leading edge of a Clock pulse as shown in diagram (v) of Fig. 2 and the corresponding constants of the circuit of DSPG being such as to provide a series of five-microsecond pulses each coincident in their commencement with the leading edge of a Clock pulse as shown in diagram (vi) of Fig. 2. By supplying the output from each of the circuits DPTG and DSPG through Gate Circuits G2 and G3 which are controlled by an output from the Black-Out waveform generator BOPG the Dot and Dash pulses are inhibited during the time of the first five Clock pulses of each complete beat of 45 pulses so as to provide series of separate groups of Dot and Dash pulses, 40 in number, and each coincident in time respectively with Clock pulses 6 to 45. These Dot and Dash waveforms are conveniently made available through buffer amplifiers BA1, BA2.

In order to allow selection of specific ones of said Dot or Dash pulse series and for other similar purposes there are provided a group of 40 single pulse waveforms, each on separate leads and each consist of a single 5-microsecond pulse coincident in timing with one or other of the Dash pulses. These waveforms will hereinafter be referred to as the "$p$ pulses" and diagram (viii) Fig. 2 shows the first of the group comprising a negative-going pulse synchronised in time with the first Dash pulse and called, for convenience in computing, the "$p0$" pulse since it coincides with the position in the group of 40 pulses, of the lowest significant figure $2^0$ in the binary scale (for convenience, the order of significance of the digit positions is assumed to increase from left to right). The next pulse of the group, the "$p1$" pulse (denoting $2^1$ in the binary scale) is shown in diagram (ix) Fig. 2 and is coincident in time with the second Dash pulse while diagrams (x) and (xi) respectively illustrate the next or "$p2$" pulse ($2^2$) and the last or "$p39$" pulse ($2^{39}$). The intervening pulses of the group are not shown since their form will be obvious. These "$p$" pulses are conveniently produced by a series of triggered circuits PPG all of which are supplied with the Dash waveform. Normally each circuit is in inoperative condition and produces no output but each can be conditioned for operation by the application of a positive transient voltage in readiness to provide an output pulse coincident with the arrival thereat of the next Dash pulse. The first trigger circuit $p^0$ of the series is conditioned by the application thereto of the Black-Out waveform while the subsequent trigger circuits $p^1$ to $p^{39}$ are each conditioned by voltages derived from the immediately preceding circuit. The last circuit $p^{39}$ is reset by the leading edge of the next following Black-Out pulse from the circuit BOPG.

The reading or interpretation of an already stored charge pattern on a cathode ray tube screen is effected by sampling a portion only of each discrete charge as the cathode ray tube beam is sweeping thereacross and for the purpose of controlling such sampling or reading instants a further series of pulses, hereinafter called the Strobe pulses are provided. These pulses which are shown in diagram (vii) Fig. 2, are positive-going and have about one microsecond duration commencing at instants slightly later than the leading edges of the Dot and Dash pulses. They are derived in the circuit shown from a pulse generator circuit SPG triggered from the Clock pulse waveform and fed, in similar manner to the Dot and Dash pulses, through the gate circuit G3, controlled by the Black-Out pulses, to a buffer amplifier BA3.

As already referred to, the natural decay of the cathode ray tube charge patterns with time, owing to leakage necessitates their frequent and repeated regeneration and this is effected where necessary in the machine described by assigning alternate X-time base scans to regeneration and using the intervening scans for operational purposes. These periods are those known as the scan and action beats respectively, each four beat bar therefore comprising a scan 1 beat, an action 1 beat, a scan 2 beat and an action 2 beat. For the purpose of effecting control of various elements during these alternate beats, two further square waveforms, at half the frequency of the Black-Out and XTB waveforms are provided as shown in diagrams (xii) and (xiii) of Fig. 3. They are derived from square wave generator circuit HWG comprising a flip-flop circuit triggered from one state to the other by the Black-Out waveform. One output comprising positive-going half cycles coincident with the scan beat periods will hereinafter be referred to as the Halver-S waveform while a second paraphase output having its positive-going half cycles coincident with the action beat periods will hereinafter be referred to as the Halver-A waveform. Fig. 3 is drawn to a time-scale four times smaller than that of Fig. 2 to illustrate the four beats of one operative cycle or bar. For comparison purposes the Black-Out waveform is reproduced while diagram (xiv) illustrates the Prepulse waveform which controls the initiation of each bar.

A number of other waveforms are involved in the machine but the form and production of these will not be dealt with here since they are not involved in the operation of the particular elements concerned with the present invention. A full description thereof is, however, to be found in the aforesaid copending application, Serial No. 165,434.

The present invention resides in the provision of a special form of accumulator A which, as shown in Figs. 1a and 1b, has in addition to its storage tube 16 with pick-up electrode 17, amplifier 18, read unit 19, write unit 20 and other ancillary items, a plurality of computing circuits 21, 22 and 23 each having first and second input terminals and an output terminal and connected by one of its input terminals and its output terminal in series with an associated controlling gate circuit G6, G7 and G8 respectively between the read unit 19 and the write unit 20 of the storage tube so as to provide, in accordance with the setting of such gate circuits, three alternative regeneration paths for the passage of the signal output from the read unit to the write unit. Each of the computing circuits 21, 22 and 23 is supplied also through its second input terminal with an external signal derived from the outward transfer gate OTG conveniently by way of isolating buffer amplifiers BA5, BA6, BA7 as shown. Each of the computing circuits is accordingly provided with two independent sources of information, one coming from the read output of the storage tube 16 and the other from an external source, normally the active address of the main store MS. In addition a further connection between the read unit 19 and the write unit 20 is provided by way of a simple gate circuit G5, so that when necessary, simple regeneration of the contents of the accumulator storage tube 16, without any arithmetical operation, can be effected by opening this gate circuit and closing each of the others.

The actual form of the computing circuits 21, 22 and 23 is immaterial to the present invention but as examples of suitable types of device, the computing circuit 21 may comprise means for adding the number words represented by two pulse signal trains as described with reference to Fig. 7 of the drawings in copending application of Frederic C. Williams et al., Serial No. 141,176 filed January 30, 1950. The computing circuit 22 may similarly consist of means for subtracting the numbers represented by the input pulse signal trains and may take a form similar to that described with reference to Fig. 13 of the drawings in the aforesaid copending application, Serial No. 141,176. The computing circuit 23 may comprise means for multiplying the two numbers represented by the input pulse trains and may take a form similar to the multiplier previously described in copending application of Arthur A. Robinson, Serial No. 132,579, filed December 12, 1949, now Patent No. 2,685,407, issued August 3, 1954. It will be understood that other forms of computing circuit, adapted to perform similar or other types of mathematical operations may be provided instead of those referred to or additional thereto under the control of one or more further gate circuits.

As shown in Fig. 1 the three computing circuits 21, 22 and 23 are all connected by way of their second input terminals to the source of external signals constituted by the main store MS via the outward transfer gate OTG and also by way of their first input terminals to the read unit 19 of the accumulator A while the four gate circuits G5, G6, G7 and G8 determine whether the signal output from the read unit is simply regenerated when gate circuit G5 is open and the remainder of the gate circuits are closed or whether the signal output from the read unit 19 is added to the signal from the outward transfer gate OTG when gate circuit G6 is open and the remainder are closed or whether the signal output from the read unit 19 has the external signal from the gate OTG subtracted from it when the gate G7 is open and the rest are closed or whether the two signals from the read unit 19 and from the gate OTG respectively are multiplied together when gate G8 is open and the remainder are closed.

The action of these gate circuits is controlled, in the embodiment being described, by the particular form of the 17th and 18th digits of the function determining portion of the instruction word which is operative at the moment and which has caused setting up of the main store staticisor MSTR.

Figure 4:
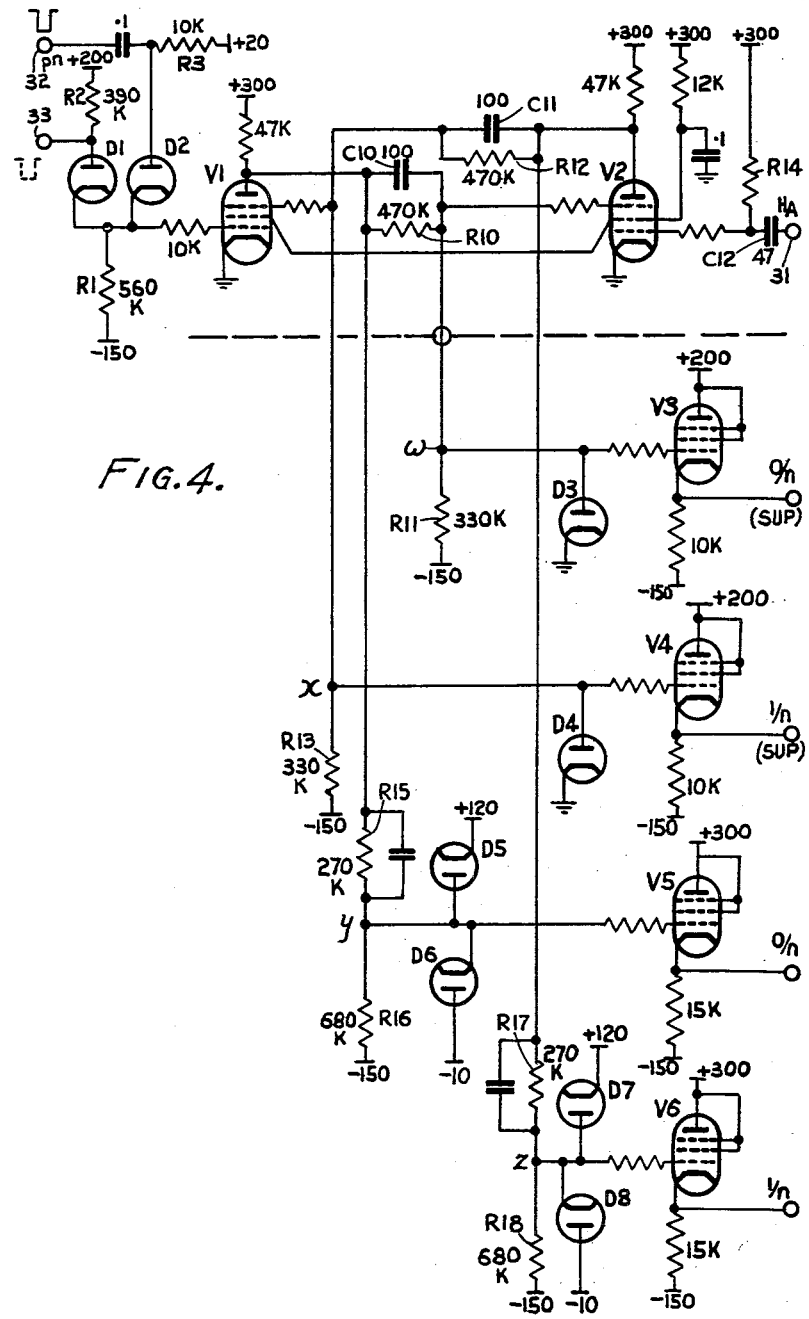

As explained in greater detail in the aforesaid copending application, Serial No. 165,434, the staticisor MSTR comprises a plurality of similar sections each comprising a trigger circuit and for the purposes of explanation one circuit arrangement of one particular trigger section of the function portion FST of such staticisor is reproduced in Fig. 4. This staticisor section comprises a two-stable-state trigger circuit of valves V1, V2 and their associated circuit components. The anode of valve V1 is cross-coupled to the suppressor grid of valve V2 through condenser C10 which is shunted by resistor R10. The anode of valve V2 is similarly cross-coupled to the suppressor grid of valve V1 by way of condenser C11 shunted by resistor R12. Resistor R10 forms, with further resistor R11, a potentiometer network leading to a source of negative potential (−150 v.). Resistor R12 similarly forms, with resistor R13, a second potentiometer network also leading to said source of negative potential (−150 v.). Diode D3 whose cathode is earthed and whose anode is connected to the junction point w of resistors R10, R11, prevents the potential of such junction from rising above earth but does not prevent movement of the potential of such junction point w in a negative direction. Diode D4 whose anode is connected to the junction point x of resistors R12, R13 and whose cathode is earthed operates similarly with reference to the potential changes at said last mentioned junction point.

The quiescent or binary "0" representing condition of the trigger circuit is that in which valve V1 is conducting to its anode and valve V2 is cut off at its suppressor grid. Its triggered or binary "1" representing condition is that in which the conditions are reversed, namely when valve V1 is cut off at its suppressor grid and valve V2 is conducting to its anode.

The quiescent condition is maintained, or the staticisor section is reset to it if the circuit has previously been triggered, at the commencement of every scan beat by the application of the Halver-A waveform to terminal 31. This waveform is differentiated by condenser C12 and resistor R14 and the negative-going pulse which occurs at the beginning of each scan beat (see diagram xiii, Fig. 3) causes complete cut off of valve V2 at its control grid. In consequence, if such valve was previously in its triggered condition and conducting to its anode, the anode potential now rises in the usual way and this rise is communicated to the suppressor grid of valve V1 to turn the latter on at its suppressor grid and thereby to cause lowering of the anode potential of valve V1, which lowering of potential is communicated back to the suppressor grid of valve V2 to cut the latter off at its suppressor grid as well as at its control grid. When, after decay of the differentiated negative-going pulse from the Halver-A waveform at terminal 31, the potential of the control grid of valve V2 again rises, this valve V2 becomes conductive only to its screen grid and its suppressor grid remains cut off by the potential applied from valve V1. The differentiated positive-going pulses produced at the commencement of each action beat period by the Halver-A waveform at terminal 31, have no effect as the control grid of valve V1 is already turned-on by that time due to the positive bias applied through resistor R14.

Triggering of the staticisor section into its "1" representing condition is effected through the multiple diode-type gate circuit constituted by diodes D1, D2 and their common cathode resistor R1 which is returned to said source of negative potential (−150 v.). The diode cathodes are also connected to the control grid of valve V1. The anode of diode D1 is returned to a source of positive potential (+200 v.) by way of resistor R2 and is also connected to input terminal 33 through which is supplied the dynamic instruction word or other controlling input voltage. The anode of diode D2 is similarly returned to a source of positive potential (+20 v.) through resistor R3 and is connected to input terminal 32 through which is supplied that particular one of the p-Pulse waveforms which is applicable to the digit position with which the staticisor section is concerned, i. e. the p13, the p14 or the p15 waveform in the present machine. Each of the waveforms applied to the terminals 32, 33 consist of negative-going pulses from a normal or resting level of earth potential so that, in the customary manner of operation of such diode gate circuits, depression of the potential of the control grid of valve V1 cannot take place until both of the applied waveforms move negatively simultaneously. This will obviously occur only during the period time of the particular applied p-Pulse waveform and then only if the dynamic instruction or like signal contains a "1" representing pulse at that particular position. When such coincidence occurs the negative potential applied to the control grid of valve V1 causes complete cut-off of all space current whereby the valve anode potential rises and transmits a positive potential to the suppressor grid of valve V2 and so turns on anode current in that valve. The resultant fall of anode potential at valve V2 is then communicated back to the suppressor grid of valve V1 to hold the latter cut off at its suppressor grid even when its control grid is again turned on by the disappearance of the coincident negative pulses in the waveforms applied to the terminals 32, 33. This is the triggered or "1" representing condition of the circuit and persists until retriggering takes place at the commencement of the next scan beat as already described.

By reason of the provision of the potentiometer networks of resistors R10, R11 and R12, R13 returned to negative potential (−150 v.) the junction points $w$ and $x$ will move between a potential very slightly above earth, at which they are caught by their related diodes D3, D4 and a potential considerably negative to earth, approx. −60 v. Junction point $w$ will be low, i. e. −60 v. when valve V1 is conducting to its anode in the quiescent or "0" representing condition of the circuit and raised to about earth potential when the valve anode is cut-off, namely when the circuit is in its triggered or "1" representing condition. Conversely, junction point $x$ will be raised to about earth potential when the circuit is in its quiescent condition and depressed to −60 v. when the circuit is in its triggered condition.

The points $w$ and $x$ are connected respectively to the control grids of valves V3 and V4 arranged as cathode followers with their respective cathode load resistors returned to a source of negative potential (−150 v.). The cathode of valve V3 is connected to an output terminal 0/$n$ (sup) and the cathode of valve V4 is connected to an output terminal 1/$n$ (sup). The potential changes at points $w$ and $x$, which correspond to the suppressor grids of valves V2 and V1 respectively, are thereby made available for external controlling purposes, the normal or quiescent condition of the staticisor section providing a potential of −60 volts at terminal 0/$n$ (sup) and 0 volts at terminal 1/$n$ (sup) and the triggered or "1" representing condition of the staticisor section providing a potential of 0 volts at terminal 0/$n$ (sup) and −60 volts at terminal 1/$n$ (sup).

The anode of valve V1 is also connected by way of potentiometer network of resistors R15, R16 to a source of negative potential (−150 v.) while the anode of valve V2 is similarly connected by way of potentiometer network of resistors R17, R18 to the same negative potential source. The junction point $y$ between resistors R15, R16 is connected to the control grid of valve V5 and also to the anode of diode D5 whose cathode is connected to a source of positive potential of +120 volts and to the cathode of diode D6 whose anode is connected to a source of negative potential of −10 volts. The values of the various circuit components are such that when valve V1 is conducting to its anode, i. e., when the staticisor section is in the quiescent condition, the potential of junction point $y$ falls to and is caught by diode D6 at about −10 volts whereas when the anode of valve V1 is cut off, the potential of junction point $y$ rises to and is caught by diode D5 at about +120 volts. The valve V5 is arranged as a cathode follower with its cathode load returned to a source of negative potential (−150 v.) and has its cathode connected to a further output terminal 0/$n$ which accordingly provides a controlling potential of −10 volts whenever the trigger circuit is in its quiescent or "0" representing condition and a potential of +120 volts when in its triggered or "1" representing condition.

The junction point $z$ between resistors R17, R18 is similarly connected to the control grid of valve V6 and to diodes D7, D8 which are biased in similar manner to the diodes D5, D6 to limit the potential excursion of the point $z$ to +120 volts when the anode of valve V2 is cut-off, i. e. when the trigger circuit is in its quiescent condition, and −10 volts when valve V2 is conducting to its anode and the trigger circuit is in its triggered or "1" representing condition.

The address selecting or L-staticisor portion LST comprises a plurality of sections in similar manner to the portion FST and the circuit arrangement of each section is substantially identical with that described above with reference to Fig. 4, except that the four output cathode follower valves V3, V4, V5 and V6 with their associated diode circuits shown below the dotted line in the figure are omitted and a single output is taken from the suppressor grid of valve V2 to control the operation of the Y-shift generator unit YSG.

One form of circuit suitable for use as any one of the gate circuits G5, G6, G7 or G8 is that of the multiple diode type, as shown in Fig. 5. Such gate circuit comprises three diodes D10, D11 and D12, i. e. of a number in accordance with the total number of input signals whose coincidence is necessary before passage of any signal therethrough can take place. Each of the diodes has its cathode connected to one end of a load resistance R10 whose opposite end is connected to a source of negative potential, e. g. −150 volts. The common cathode connection of the diodes conveniently forms an output terminal and is connected, in the example shown, to the control grid of an interposed buffer valve V10 arranged as a cathode follower with the output terminal 25 of the gate connected to its cathode. The anodes of the respective diodes D10, D11 and D12 are connected by way of terminals 26, 27 and 28, one to the output from the associated computer circuit and the others to suitable terminals on the particular sections of the portion FST of the main store staticisor MSTR so chosen that a suitable negative potential will be applied to each terminal when and only when the particular staticisor sections are set in accordance with the chosen combination of the 17th and 18th digits of an instruction word which calls for the use of a particular computing element.

For illustrative example it will be assumed in the present case that the digit combination "00" for the 17th and 18th digits of an instruction word indicates the desired use of the straight regenerative circuit without any computing operation whatever. To provide this facility terminals 27 and 28 of an arrangement according to Fig. 5 constituting the gate circuit G5 would be connected respectively to the terminal 0/$n$ (sup) of each of the 17th and 18th digit sections of the staticisor MSTR. Only when each of these sections rests in the untriggered or "0" state will the appropriate negative potentials be applied to each diode anode to allow the negative going signal from the computing circuit to be effective in changing the potential level at the cathode end of the load resistor.

Similarly the digit combination "10" could be used to indicate desired use of the adding circuit 21 and the corresponding terminals 27, 28 of the gate circuit G6 would, in this instance, be connected respectively to the terminal 1/$n$ (sup) of the 17th digit section and the terminal 0/$n$ (sup) of the 18th digit section of the staticisor MSTR. Only when this digit combination is set up on the staticisor will the gate be open and the computing circuit rendered operative.

In similar manner the gates G7 and G8 associated with the subtracting circuit 22 and the multiplying circuit 23 may be made effective for the digit combinations "01" and "11".

While the cathode-ray-tube 16 of the accumulator A in the present simple embodiment is arranged to provide only one storage line or address capable of recording a signal comprising a number of digits within the storage capacity of the line, some operations, particularly multiplying, may need two lines in the cathode-ray-tube for its storage and means to enable information to be written on or read out from either of these lines separately or in desired order. Such arrangements, which form no part of the present invention, may be provided in the manner already described in the aforesaid copending application Serial No. 165,434. Certain forms of multiplying circuit, such as those described in copending application of Frederic C. Williams et al., Serial No. 149,224, filed March 13, 1950, involve the use of a further adding circuit. A multiplying circuit of this form could be included in the apparatus already described in the manner shown in Fig. 6 where an additional adding circuit 24 is connected between the external source of signals from gate OTG and the related input to the adding circuit 21. This involves the use of additional gate circuit arrangements G9 and G10 as shown whereby the circuit 24 may be cut out of use when not required. These gate circuits are arranged for control by the associated staticisor in similar manner to those previously described, the gate circuit G9 being arranged to be opened only on the application of one particular digit combination to the staticisor and the opposite gate circuit G10 being arranged to be normally open and closed only on the application of such digit combination. With such arrangement it is possible for the two signals to be multiplied both to be introduced into the multiplier 24 from some external source by way of the gate circuit OTG and the result written on to the cathode ray tube screen in the absence of a signal already present there. Alternatively, a signal already stored on this cathode ray tube screen may be used as the source of one of the signals fed to the multiplying circuit through a further connection controlled by the action of a gate circuit not shown.

We claim:

1. In an electronic binary digital computing machine operating in the serial mode with number-representing signals in the form of electric pulse signal trains and which comprises a main data storage device for recording both number and instruction-representing signals, an accumulator having an input terminal for applying number-representing signals thereto, a control unit for governing the rhythmic operation of the machine and having an instruction input terminal and an instruction output terminal, an instruction staticisor comprising a plurality of separate sections each operative according to the significance of a different digit of an instruction-representing signal and including a common instruction input terminal and a plurality of separate control potential output terminals and circuit interconnections between the output terminal of said main store and the input terminals of said accumulator and said control unit and between said instruction output terminal of said control unit and said instruction input terminal of said instruction staticisor, said circuit interconnections including a plurality of gate circuit devices controlled by the output potentials of said instruction staticisor, the construction of said accumulator to comprise a cathode ray tube electrostatic storage device including a source of an electron beam, control means controlling the activity of said beam and an insulating storage surface in the path of said beam, a pick-up electrode adjacent to said storage surface and an amplifier having its input terminal connected to said pick-up electrode and having an output terminal, a first computing circuit device having first and second input terminals and an output terminal, for performing a chosen first mathematical operation between two input number-representing signals applied respectively to said first and second input terminals and providing a first answer-representing signal at said output terminal, a second computing circuit device having first and second input terminals and an output terminal, for performing a second mathematical operation, different from that of said first computing circuit device, between two number-representing signals applied respectively to said first and second input terminals and providing a second answer-representing signal at said output terminal, a first gate circuit having input and output signal terminals and control potential input terminals, a second gate circuit having input and output signal terminals and control potential terminals, circuit means interconnecting the first input terminal of said first and said second computing circuit devices to the output terminal of said amplifier, circuit means connecting the output terminal of said first computing device to the input terminal of said first gate circuit, circuit means connecting the output terminal of said second computing circuit device to the input terminal of said second gate circuit, circuit means connecting the signal output terminals of said first and second gate circuits to said control means of said storage device, circuit connecting means between said control potential terminals of said first and second gate circuits and said control output terminals of said staticisor device whereby said first gate circuit can be opened by one configuration of digits of an instruction representing signal applied to said staticisor device and whereby said second gate circuit can be opened only when another and different configuration of instruction digits is provided in said instruction-representing signal is applied to said staticisor device, a first buffer circuit having input and output terminals, a second buffer circuit having input and output terminals, circuit means connecting the output terminal of said first buffer circuit to the second input terminal of said first computing device, circuit means connecting the output terminal of said second buffer circuit to said second input terminal of said second computing device and circuit means connecting the input terminals of said first and second buffer circuit to the input terminal of said accumulator unit whereby under the control of an instruction signal supplied from said control unit to said staticisor device, a number fed from said main store may be mathematically combined in either of two different ways with a number signal derived from said accumulator storage device and the resultant answer number re-written in said accumulator storage device in the place previously occupied by said derived number.

2. In an electronic binary digital computing machine operating in the serial mode with number-representing signals in the form of electric pulse signal trains and which comprises a main data storage device for recording both number and instruction-representing signals, an accumulator having an input terminal for applying number-representing signals thereto, a control unit for governing the rhythmic operation of the machine and having an instruction input terminal and an instruction output terminal, an instruction staticisor comprising a plurality of separate sections each operative according to the significance of a different digit of an instruction-representing signal and including a common instruction input terminal and a plurality of separate control potential output terminals and circuit interconnections between the output terminal of said main store and the input terminals of said accumulator and said control unit and between said instruction output terminal of said control unit and said instruction input terminal of said instruction staticisor, said circuit interconnections including a plurality of gate circuit devices controlled by the output potentials of said instruction staticisor, the construction of said accumulator to comprise a cathode ray tube electrostatic storage device including a source of an electron beam, control means controlling the activity of said beam and an insulating storage surface in the path of said beam, a pick-up electrode adjacent to said storage surface and an amplifier having its input terminal connected to said pick-up electrode and having an output terminal, an adding circuit device having first and second input terminals and an output terminal for performing an adding operation between two input number-representing signals applied respectively to said first and second input terminals and providing a sum-representing signal at said output terminal, a second computing circuit device having first and second input terminals and an output terminal for performing a subtracting operation between two number-representing signals applied respectively to said first and second input terminals and providing a difference-representing signal at said output terminal, a first gate circuit having input and output signal terminals and control potential input terminals, a second gate circuit having input and output signal terminals and control potential terminals, circuit means interconnecting the first input terminal of said adding and said subtracting circuit devices to the output terminal of said amplifier, circuit means connecting the output terminal of said adding device to the input terminal of said first gate circuit, circuit means connecting the output terminal of said subtracting circuit device to the input terminal of said second gate circuit, circuit means connecting the signal output terminals of said first and second gate circuits to said control means of said storage device, circuit connecting means between said control potential terminals of said first and second gate circuits and said control output terminals of said staticisor device whereby said first gate circuit can be opened by one configuration of digits of an instruction-representing signal applied to said staticisor device and whereby said second gate circuit can be opened only when another and different configuration of instruction digits is provided in said instruction-representing signal applied to said staticisor device, a first buffer circuit having input and output terminals, a second buffer circuit having input and output terminals, circuit means connecting the output terminal of said first buffer circuit to the second input terminal of said adding device, circuit means connecting the output terminal of said second buffer circuit to said second input terminal of said subtracting device and circuit means connecting the input terminals of said first and second buffer circuit to the input terminal of said accumulator unit whereby under the control of an instruction signal supplied from said control unit to said staticisor device, a number represented by a signal fed from said main store may be added to or subtracted from a number represented by a signal derived from said accumulator storage device and the resultant sum or difference answer number-representing signal re-written in said accumulator storage device in the place previously occupied by said derived number-representing signal.

3. In an electronic binary digital computing machine operating in the serial mode with number-representing signals in the form of electric pulse signal trains and which comprises a main data storage device for recording both number and instruction-representing signals, an accumulator having an input terminal for applying number-representing signals thereto, a control unit for governing the rhythmic operation of the machine and having an instruction input terminal and an instruction output terminal, an instruction staticisor comprising a plurality of separate sections each operative according to the significance of a different digit of an instruction-representing signal and including a common instruction input terminal and a plurality of separate control potential output terminals and circuit interconnections between the output terminal of said main store and the input terminals of said accumulator and said control unit and between said instruction output terminal of said control unit and said instruction input terminal of said instruction staticisor, said circuit interconnections including a plurality of gate circuit devices controlled by the output potentials of said instruction staticisor, the construction of said accumulator to comprise a cathode ray tube electrostatic storage device including a source of an electron beam, control means controlling the activity of said beam and an insulating storage surface in the path of said beam, a pick-up electrode adjacent to said storage surface and an amplifier having its input terminal connected to said pick-up electrode and having an output terminal, an adding circuit device having first and second input terminals and an output terminal for performing an adding operation between two input number-representing signals applied respectively to said first and second input terminals and providing a sum-representing signal at said output terminal, a multiplying circuit device having first and second input terminals and an output terminal for performing a multiplying operation between two number-representing signals applied respectively to said first and second input terminals and providing a product-representing signal at said output terminal, a first gate circuit having input and output signal terminals and control potential input terminals, a second gate circuit having input and output signal terminals and control potential terminals, circuit means interconnecting the first input terminal of said adding and said multiplying circuit devices to the output terminal of said amplifier, circuit means connecting the output terminal of said adding device to the input terminal of said first gate circuit, circuit means connecting the output terminal of said multiplying circuit device to the input terminal of said second gate circuit, circuit means connecting the signal output terminals of said first and second gate circuits to said control means of said storage device, circuit connecting means between said control potential terminals of said first and second gate circuits and said control output terminals of said staticisor device whereby said first gate circuit can be opened by one configuration of digits of an instruction representing signal applied to said staticisor device and whereby said second gate circuit can be opened only when another and different configuration of instruction digits is provided in said instruction-representing signal applied to said staticisor device, a first buffer circuit having input and output terminals, a second buffer circuit having input and output terminals, circuit means connecting the output terminal of said first buffer circuit to the second input terminal of said adding device, circuit means connecting the output terminal of said second buffer circuit to said second input terminal of said multiplying device and circuit means connecting the input terminals of said first and second buffer circuit to the input terminal of said accumulator unit whereby under the control of an instruction signal supplied from said control unit to said staticisor device, a number represented by a signal fed from said main store may be added to or multiplied by a number represented by a signal derived from said accumulator storage device and the sum or product answer number-representing signal re-written in said accumulator storage device in the place previously occupied by said derived number-representing signal.

4. In an electronic binary digital computing machine operating in the serial mode with number-representing signals in the form of electric pulse signal trains and which comprises a main data storage device for recording both number and instruction-representing signals, an accumulator having an input terminal for applying number-representing signals thereto, a control unit for governing the rhythmic operation of the machine and having an instruction input terminal and an instruction output terminal, an instruction staticisor comprising a plurality of separate sections each operative accordingly to the significance of a different digit of an instruction-representing signal and including a common instruction input terminal and a plurality of separate control potential output terminals and circuit interconnections between the output terminal of said main store and the input terminals of said accumulator and said control unit and between said instruction output terminal of said control unit and said instruction input terminal of said instruction staticisor, said circuit interconnections including a plurality of gate circuit devices controlled by the output potentials of said instruction staticisor, the construction of said accumulator to comprise a cathode ray tube electrostatic storage device including a source of an electron beam, control means controlling the activity of said beam and an insulating storage surface in the path of said beam, a pick-up electrode adjacent to said storage surface and an amplifier having its input terminal connected to said pick-up electrode and having an output terminal, a first computing circuit device having first and second input terminals and output terminal for performing a chosen first mathematical operation between two input number-representing signals applied respectively to said first and second input terminals and providing a first answer-representing signal at said output terminal, a second computing circuit device having first and second input terminals and an output terminal for performing a second mathematical operation, different from that of said first computing circuit device, between two number-representing signals applied respectively to said first and second input terminals and providing a second answer-representing signal at said output terminal, first, second and third gate circuit each having input and output signal terminals and control potential input terminals, circuit means interconnecting the first input terminal of said first and said second computing circuit devices and the input signal terminal of said third gate circuit to the output terminal of said amplifier, circuit means connecting the output terminal of said first computing device to the input terminal of said first gate circuit, circuit means connecting the output terminal of said second computing circuit device to the input terminal of said second gate circuit, circuit means connecting the signal output terminals of said first, and second and third gate circuits to said control means of said storage device, circuit connecting means between said control potential terminals of said first, second and third gate circuits and said control output terminals of said staticisor device whereby said first gate circuits can be opened only by a first configuration of digits of an instruction representing signal applied to said staticisor device and whereby said second gate circuit can be opened only when a second and different configuration of instruction digits is provided in said instruction-representing signal applied to said staticisor device and whereby said third gate circuit is closed whenever said first or second configuration of instruction digits is provided in said instruction representing signal, a first buffer having input and output terminals, a second buffer circuit having input and output terminals, circuit means connecting the output terminal of said first buffer circuit to the second input terminal of said first computing device, circuit means connecting the output terminal of said second buffer circuit to said second input terminal of said second computing device and circuit means connecting the input terminals of said first and second buffer circuit to the input terminal of said accumulator unit whereby under the control of an instruction signal supplied from said control unit to said staticisor device, a number represented by a signal fed from said main store may be mathematically combined in either of two different ways with a number-representing signal derived from said accumulator storage device and the resultant answer number-representing signal rewritten in said accumulator storage device in the place previously occupied by said derived number-representing signal or said derived number-representing signal may be regenerated without alteration.

References Cited in the file of this patent

UNITED STATES PATENTS 2,596,741    Tyler et al.           May 13, 1952
2,604,262    Phelps et al.          July 22, 1952

OTHER REFERENCES

"A Memory Tube," Andrew Haeff, Electronics, September 1947, pages 80–83.

"Digital Computer Switching Circuits," C. H. Page, Electronics, September 1948, pages 110–118.

"A Digital Computer for Scientific Applications," C. F. West and J. E. De Turk, Proceedings of the IRE., December 1948, pages 1452–1460.